(12) United States Patent
Seo

(10) Patent No.: US 9,432,926 B2
(45) Date of Patent: Aug. 30, 2016

(54) ATTEMPTING TO ACCESS NETWORK BASED ON A SERVICE PROVIDER IDENTIFICATION

(75) Inventor: Hanshin Seo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 985 days.

(21) Appl. No.: 13/428,700

(22) Filed: Mar. 23, 2012

(65) Prior Publication Data

US 2012/0243506 A1    Sep. 27, 2012

(30) Foreign Application Priority Data

Mar. 23, 2011 (KR) ........................ 10-2011-0025817

(51) Int. Cl.
*H04W 4/00* (2009.01)
*H04W 48/20* (2009.01)
*H04W 36/08* (2009.01)
*H04W 36/00* (2009.01)

(52) U.S. Cl.
CPC ............. *H04W 48/20* (2013.01); *H04W 36/08* (2013.01); *H04W 36/0011* (2013.01)

(58) Field of Classification Search
CPC ............... H04W 80/04; H04W 36/18; H04W 36/0011; H04W 36/06; H04W 36/08; H04W 36/14; H04W 36/00; H04W 48/02; H04W 48/20

See application file for complete search history.

(56) References Cited

U.S. PATENT DOCUMENTS

| 2004/0266436 | A1* | 12/2004 | Jaakkola et al. ............. 455/436 |
| 2007/0184836 | A1* | 8/2007 | He ................. 455/434 |
| 2008/0101300 | A1* | 5/2008 | Oh ................. 370/332 |
| 2008/0159232 | A1* | 7/2008 | Thalanany et al. .......... 370/332 |
| 2008/0244095 | A1* | 10/2008 | Vos et al. ...................... 709/250 |
| 2009/0111458 | A1* | 4/2009 | Fox et al. ................. 455/422.1 |
| 2010/0105378 | A1* | 4/2010 | Shi et al. ................... 455/432.1 |
| 2010/0157864 | A1* | 6/2010 | Salomone et al. ............ 370/311 |
| 2010/0173628 | A1* | 7/2010 | Hosain et al. ............. 455/432.1 |
| 2010/0195534 | A1* | 8/2010 | Song et al. .................. 370/254 |
| 2010/0214943 | A1* | 8/2010 | Immendorf et al. ......... 370/252 |
| 2010/0329123 | A1* | 12/2010 | Viswanathan et al. ....... 370/241 |
| 2011/0007709 | A1* | 1/2011 | Akiyoshi ...................... 370/331 |
| 2011/0009139 | A1* | 1/2011 | Nagata et al. ................ 455/509 |
| 2011/0044253 | A1* | 2/2011 | Zisimopoulos ............... 370/328 |

* cited by examiner

*Primary Examiner* — Ian N Moore
*Assistant Examiner* — Phong La
(74) *Attorney, Agent, or Firm* — The Farrell Law Firm, P.C.

(57) ABSTRACT

A method and an apparatus for attempting to access a network from among a plurality of networks by a mobile terminal is provided. The method includes attempting to access the network through at least one target channel determined by the mobile terminal, such that the at least one target channel has a measured signal quality value at least equal to a predetermined reference value among signal quality values measured for channels corresponding to network access provider identification information indicating a network having a highest priority among the plurality of networks.

8 Claims, 2 Drawing Sheets

ATTEMPTING TO ACCESS NETWORK BASED ON A SERVICE PROVIDER IDENTIFICATION

PRIORITY

This application claims priority under 35 U.S.C. §119(a) to an application filed in the Korean Industrial Property Office on Mar. 23, 2011 and assigned Serial No. 10-2011-0025817, the entire contents of which are incorporated herein by reference.

BACKGROUND OF THE INVENTION

1. Field of the Invention

The present invention relates generally to a method and an apparatus for attempting to access a network, and more particularly, to a method and an apparatus for attempting to access a network based on a network service provider identifier in a mobile terminal.

2. Description of the Related Art

Wireless communication systems generally support a communication service for a mobile terminal in an environment in which a plurality of service provider networks exists. To this end, a wireless communication system may perform channel scanning in order to provide network access to a mobile terminal. For example, a mobile Worldwide Interoperability for Microwave Access (WiMAX) system performs channel scanning for reconstruction and selection of a network by using a Contractual Agreement Preference List (CAPL) item of an Open Mobile Alliance-Device Management (OMA-DM) Tree.

The CAPL item includes a Network Access Provider IDentifier (NAP ID) for identifying a network service provider, a priority of the NAP ID, and information on related channels and policies. Herein, a NAP ID priority refers to a priority of a network service provider that a terminal refers to when the terminal accesses a network. Further, when different channels are allocated to network service providers, the priority of NAP ID may refer to a priority of a channel of each network service provider.

Specifically, in a channel scanning operation in a conventional mobile WiMAX system, a mobile terminal makes a channel list for each network service provider by using a NAP ID and a priority of the NAP ID. Based on the generated channel list, the mobile terminal performs channel scanning and attempts to access a network.

For example, when a NAP ID corresponding to a scanned channel has a highest priority among channels in the channel list, the mobile terminal instantly attempts a network access to the channel having the NAP ID of the highest priority. If the attempt to access the network through the channel having the highest priority NAP ID fails, the mobile terminal attempts to access the network through the next channel in the list according to NAP ID priority. In this manner, the mobile terminal scans all the channels in the channel list until the mobile terminal succeeds in accessing a particular channel.

However, the channel scanning method as described above may require significant time in order to access the network. For example, if a channel that the mobile terminal can successfully access is located at a lower part of the channel list, the mobile terminal may waste significant time by attempting to access other channels first.

SUMMARY OF THE INVENTION

Accordingly, an aspect of the present invention is to address at least the above-mentioned problems, and to provide at least the advantages described below. Accordingly, an aspect of the present invention is to provide an apparatus and a method for attempting a network access that can improve the network access performance in consideration of the signal quality of a channel as well as an identifier of a network service provider.

Another aspect of the present invention is to provide an apparatus and a method for attempting to access a network through only channels satisfying a predetermined reception quality among channels corresponding to a network having a highest priority.

Another aspect of the present invention is to provide an apparatus and a method for attempting to access a network that can efficiently maintain a reference value for selecting a channel that a mobile terminal attempts to access.

Another aspect of the present invention is to provide an apparatus and a method for attempting to access a network through other channels when all attempts to access a network through the channels satisfying a predetermined reception quality among channels corresponding to a network having the highest priority fails.

In accordance with an aspect of the present invention, a method for attempting to access a network from among a plurality of networks by a mobile terminal is provided. The method includes attempting to access the network through at least one target channel determined by the mobile terminal, such that the at least one target channel has a measured signal quality value at least equal to a predetermined reference value among signal quality values measured for channels corresponding to network access provider identification information indicating a network having a highest priority among the plurality of networks.

In accordance with another aspect of the present invention, an apparatus for attempting to access a network from among a plurality of networks by a mobile terminal is provided. The apparatus includes a transceiver for transmitting or receiving a signal; and a controller for controlling the transceiver to attempt to access the network through at least one target channel determined by the mobile terminal such that the at least one target channel has a measured signal quality value satisfying a predetermined reference value among signal quality values measured for channels corresponding to network access provider identification information indicating a network having a highest priority among the plurality of networks.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention are described with reference to the accompanying drawings. In the following description, a detailed description of known functions and configurations incorporated herein may be omitted when such a description may obscure the subject matter of the present invention.

Embodiments of the present invention may include arranging a scheme for attempting a network access in consideration of both a priority of a Network Access Provider Identifier (NAP ID) and signal quality of channels.

To this end, according to an embodiment of the present invention, a list of channels to be scanned is generated based on a priority of a network service provider, and the mobile terminal attempts to access a network through a channel that has a network service provider identifier of a highest priority in the channel list and has a signal quality value at least equal to a reference value.

The channel list for the channel scanning may be made based on the information provided to the terminal from the network. For example, the information provided to the terminal may include information identifying network service providers, priority information, and channel information corresponding to each network service provider. There may be one or more channels corresponding to each network service provider.

The following description on embodiments of the present invention is based on a mobile WiMAX system using a NAP ID as a network service provider identifier, as an example. However, embodiments of the present invention are not limited to a WiMAX system and may be also applied to other wireless communication systems.

Figure 1:
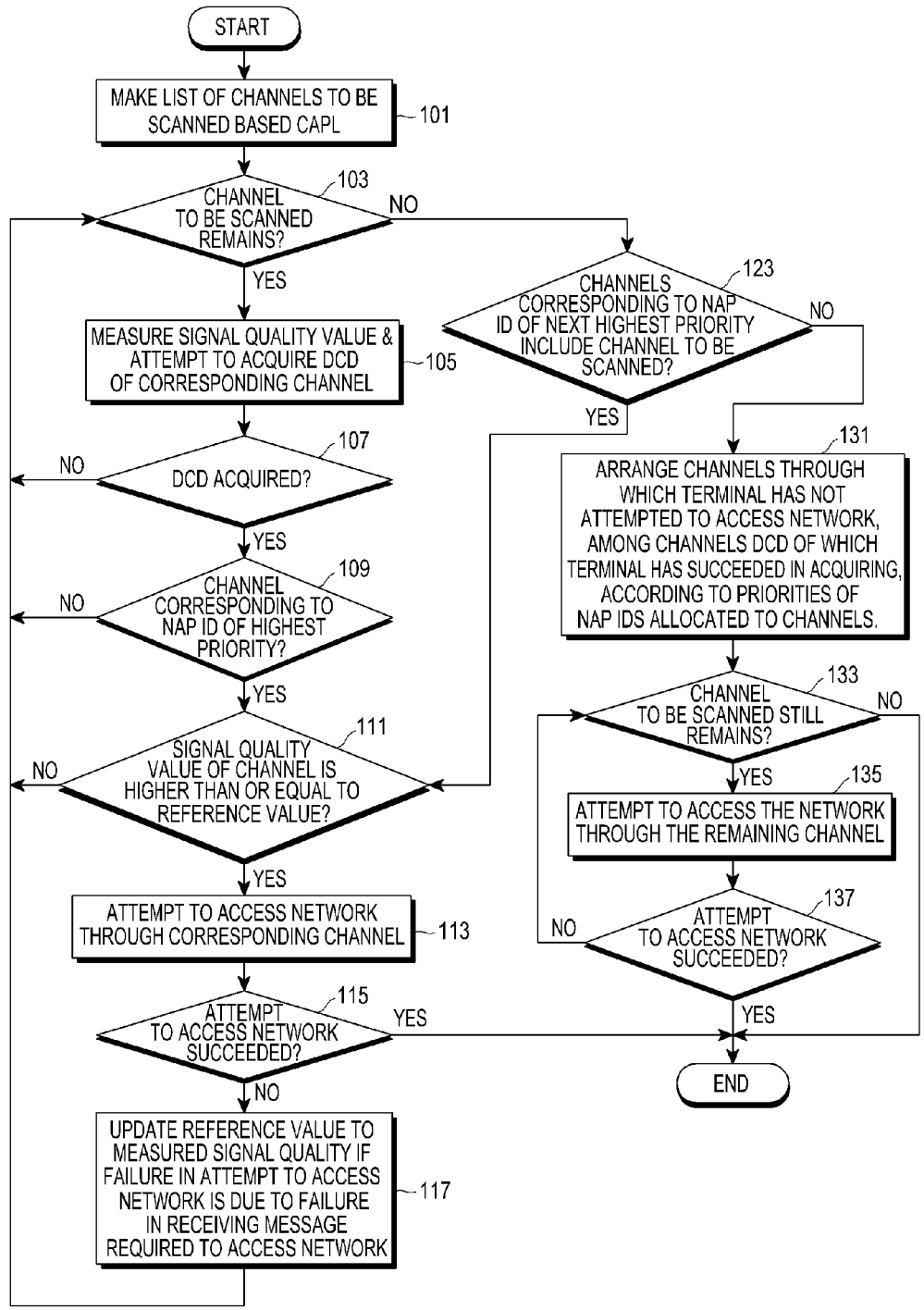
FIG. 1 is a flowchart illustrating a control flow for attempting a network access by a mobile terminal according to an embodiment of the present invention.

FIG. 1 is a flowchart illustrating a control flow for attempting a network access by a mobile terminal according to an embodiment of the present invention.

Referring to FIG. 1, in step 101, the mobile terminal makes a channel list including channels to be scanned. For example, the channel list may be based on a CAPL. The CAPL includes an NAP ID of a network service provider, a priority of the NAP ID, and channel information. In this event, the terminal may make the channel list based on the priority of the NAP ID. For example, the terminal may make a channel list in which priorities of NAP IDs are arranged in a descending order, and the terminal may perform the channel scanning in a sequence from a channel corresponding to an NAP ID of a higher priority to a channel corresponding to an NAP ID of a lower priority based on the channel list.

The terminal attempts to access a network through a channel having a measured signal quality value satisfying a signal reference value among signal quality values measured for channels having an NAP ID of a highest priority based on the channel list.

In step 103, the terminal determines whether a channel to be scanned remains in the channel list. More specifically, the terminal determines whether the channels existing in the channel list include any channels that have not been scanned yet.

When there is a channel to be scanned, the terminal proceeds to step 105. Otherwise, the terminal proceeds to step 123.

In step 105, the terminal measures a signal quality value of a channel to be scanned. The signal quality value corresponds to information indicating the channel state. For example, the signal quality value may be indicated by a Received Signal Strength Indicator (RSSI), a Carrier to Interference and Noise Ratio (CINR), a Signal to Interference and Noise Ratio (SINR), etc.

When the NAP IDs are arranged in the channel list in a descending order, the terminal may measure the signal quality values of each channel in sequence from a channel at a higher position to a channel at a lower position according to the arrangement in the channel list.

In step 105, the terminal also attempts to acquire a Downlink Channel Descriptor (DCD) through the channel. The DCD corresponds to a Media Access Control (MAC) layer message, which describes physical attributes of a downlink channel. The DCD includes network access information. Meanwhile, in order to acquire the DCD, it is necessary to know an NAP ID of a network to access (for example, a channel to access the network). For example, the NAP ID includes a Base Station (BS) ID for identifying a BS to access. Therefore, by securing a BS ID of a BS that the terminal will access, the BS can obtain the NSP ID for acquiring the DCD.

In step 107, the terminal determines whether the DCD of the channel, the signal quality value of which has been measured, has been acquired. If the DCD of the channel has been acquired, the terminal proceeds to step 109. Otherwise, the terminal returns to step 103.

When the DCD has been acquired, the terminal proceeds to step 109 and determines whether the channel, the DCD of which has been acquired, is a channel corresponding to an NAP ID of the highest priority. If the channel is a channel corresponding to an NAP ID of the highest priority, the terminal proceeds to step 111. Otherwise, the terminal returns to step 103.

When the channel corresponds to an NAP ID of the highest priority, the terminal proceeds to step 111 and determines whether the measured signal quality value of the channel is at least equal to a reference value. If the measured signal quality value of the channel is higher than or equal to a reference value, the terminal proceeds to step 113. Otherwise, the terminal returns to step 103.

As explained above, if the terminal fails to acquire the DCD in step 107, if the channel does not correspond to an NAP ID of the highest priority in step 109, or if the signal quality value of the corresponding channel does not satisfy a predetermined condition in step 111, the terminal returns to step 103. Upon returning to step 103, the terminal selects another channel to be scanned.

However, if the channel selected in step 103 satisfies all of the above three conditions corresponding to steps 107, 109, and 111, the terminal attempts to access a network through the selected channel in step 113. Through the above-described process, it is possible to prevent the terminal from attempting to access a network through a channel that has an NAP ID of a high priority but also has a bad channel quality. Accordingly, it is possible to induce an access to the network through another channel that has an acceptable channel quality and has the same priority or a next highest priority.

According to the process described above, if even a channel corresponding to an NAP ID of the highest priority has a signal quality that does not satisfy a predetermined reference value, the terminal will not attempt to access the network through the channel. In step 115, the terminal determines whether the attempt to access the network is successful. If the terminal successfully accesses the network, the terminal terminate the process.

However, when the attempt to access the network has failed, the terminal proceeds to step 117 and analyzes the cause of the failure. Further, if the cause of the failure in the attempt to access the network is a failure in receiving a message responding to the attempt to access the network, the terminal updates a reference value for determining whether to attempt to access the network through a target channel.

For example, the terminal may change a prior reference value to a new reference value based on a particular signal quality for the target channel.

When a network access attempt is unsuccessful, it is possible to consider that the failure is due to a lack of quality of the corresponding channel. Therefore, it may be necessary to raise the reference value for the reception quality of the channel through which an attempt to access the network will be made. For example, if the measured signal quality value of the target channel is greater than the prior reference value, the prior reference value may be updated to the measured signal quality value.

Meanwhile, the reference value may be initialized according to a pre-determined condition in order to prevent excessively raising the reference value without initializing the reference value.

For example, the reference value may be periodically initialized using a timer operated from the time point at which the reference value is updated or initialized. The reference value may alternatively be initialized when the terminal has moved from a position at which the reference value is updated or initialized. Alternatively, the reference value may be also initialized when an attempt to access the network through a channel having a measured reception quality value that does not satisfy the reference value succeeds.

Meanwhile, if the terminal determines, in step 103, that there are no remaining channels to be scanned in the channel list, the terminal proceeds to step 123, where the terminal determines whether channels corresponding to an NAP ID of a next highest priority include a channel to be scanned. If channels corresponding to an NAP ID of a next highest priority include a channel to be scanned, the terminal proceeds to step 111. Otherwise, the terminal proceeds to step 131.

When the terminal fails in all the attempts to access the network through the channels satisfying the reference value after succeeding in acquiring the DCD among the channels corresponding to the NAP ID of the highest priority, the terminal attempts to access the network through a channel satisfying the reference value among channels corresponding to an NAP ID of the next highest priority. If there is no channel corresponding to the NAP ID of the next highest priority, either, the terminal attempts to access the network through channels that do not satisfy the reference value.

More specifically, in step 131, the terminal arranges the channels through which the terminal has not attempted to access the network, from among the channels the DCD of which the terminal has succeeded in acquiring. The terminal arranges these channels according to the priorities of the NAP IDs allocated to the channels. For example, the terminal may arrange these channels, which do not satisfy the reference value and have not been utilized in attempts to access to the network, in order according to their priority.

In step 133, the terminal determines whether a channel to be scanned remains in the channels arranged by the terminal. When multiple channels to be scanned remain, the terminal may select a channel having a highest priority from among the remaining arranged channels.

When a channel to be scanned still remains in the channels arranged by the terminal, the terminal attempts to access the network through the remaining channel in step 135 and then proceeds to step 137.

In step 137, the terminal determines whether the attempt to access the network through the channel was successful. If the attempt to access the network through the channel did not succeed, the terminal proceeds to step 133 and selects a new channel for the channel scanning. However, it the attempt is successful, the procedure ends.

Figure 2:
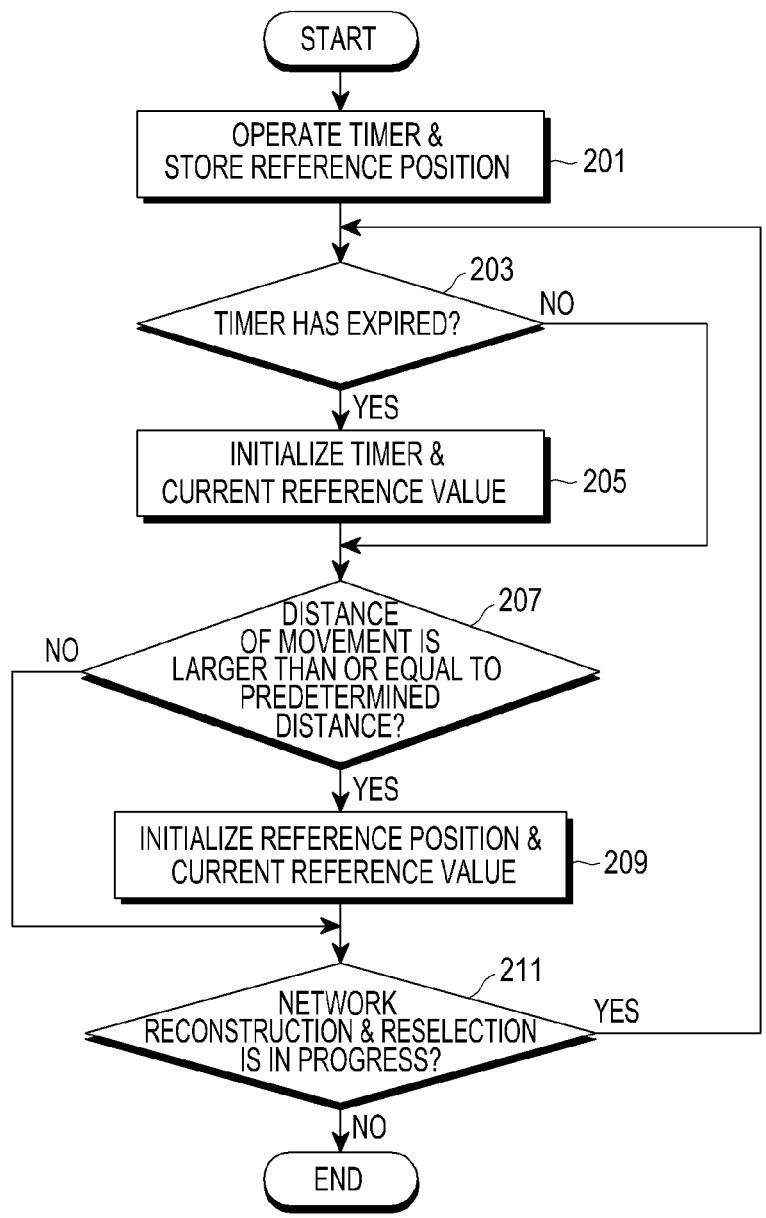
FIG. 2 is a flowchart illustrating a control flow for initializing a reference value for selecting a channel for access to a network according to an embodiment of the present invention.

FIG. 2 is a flowchart illustrating a control flow for initializing a reference value for selecting a channel for access to a network according to an embodiment of the present invention.

According to embodiments of the present invention, the operation of initializing the reference value prevents the reference value from being raised to an excessively high value. An excessively high reference value may cause a failure or delay in accessing a network.

Referring to FIG. 2, in step 201, the terminal operates a timer or stores a reference position when a reference value is initialized or updated. In this event, the timer may be properly operated within a proper time range according to the intention of the operator. Further, the reference position may be a position of the terminal at a current time point registered in the network.

In step 203, the terminal determines whether the previously operated timer has expired. When the timer has expired, the terminal proceeds to step 205 and initializes the timer and the current reference value. As an alternative or in addition to the initialization in step 205, the timer may be initialized during step 201. In step 207, the terminal determines whether a distance between the current position of the terminal and the previously stored reference position is at least equal to a predetermined distance. When the terminal has moved a distance greater than or equal to the predetermined distance from the reference position, the terminal proceeds to step 209 and initializes both the reference position and the current reference value. As an alternative or in addition to the initialization in step 209, the reference position may be initialized when the reference position is stored in step 201.

In either or both of steps 205 and 209, the reference value may be initialized to a value separately set by the operator, instead of an initially set value previously set within the terminal.

In step 211, the terminal determines whether a network reconstruction and reselection is in progress. When a network reconstruction and reselection is in progress, the terminal proceeds to step 203 and continues to perform the process for the network access.

Meanwhile, although not shown in the drawings, an attempt to access the network through a channel having a signal quality value lower than the current reference value has succeeded may correspond to a state in which the current reference value has been excessively raised. When such a situation occurs, the current reference value may be initialized.

Further, in the example described with reference to FIG. 2, the reference value may be initialized when the timer expires and when the terminal has moved beyond a predetermined distance. However, these two cases may be selectively employed in accordance with embodiments of the present invention. For example, according to other embodiments of the present invention, the reference value may be initialized only when the timer expires or only when the terminal moves more than a predetermined distance. In addition, the reference value may be initialized only when both the timer expires and the terminal has moved beyond a predetermined distance.

Hereinafter, a structure and a function of a terminal according to an embodiment of the present invention, to which the network access method as described above is applied, is described with reference to FIG. 3.

Figure 3:
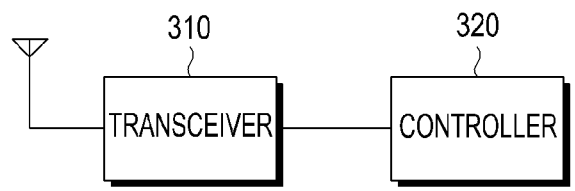
FIG. 3 is a block diagram illustrating a terminal according to an embodiment of the present invention.

FIG. 3 is a block diagram illustrating a terminal according to an embodiment of the present invention. Terminals according to embodiments of the present invention may also include elements other than the elements described with reference to FIG. 3.

Referring to FIG. 3, a transceiver unit 310 includes a transceiver for signal transmission and reception between the terminal and the network.

A controller 320 makes a list of channels to be scanned, based on priorities of network service provider identifiers, such as priorities of NAP IDs, and initially attempts to access a network through a channel that has a signal quality value at least equal to a reference value and also has a network service provider identifier of a highest priority from among the channels in the channel list. The controller 320 may make a channel list in which channels are arranged in a descending order from a channel having a NAP ID of the highest priority to a channel having a lowest priority.

More specifically, when the channels in the channel list includes a channel that has not been scanned yet, the controller 320 measures the signal quality of the channel and attempts to acquire a DCD of the channel. After the DCD of the channel has been acquired, if the channel has the NAP ID of the highest priority and has a signal quality value at least equal to a current reference value of the channel, the controller 320 attempts to access the network through the channel.

When the channel list does not include a channel that has not been scanned yet, the controller 320 attempts to access the network through a channel which has an NAP ID of the next highest priority and has a signal quality value at least equal to a reference value of the channel, from among the channels the DCDs of which have been acquired.

Therefore, according to an embodiment of the present invention, when the signal quality value of the channel corresponding to the NAP ID of the highest priority is lower than the reference value, the terminal attempts to access the network sequentially through channels of the next highest priorities.

Further, when the attempts to access the network through all the channels satisfying the reference value are unsuccessful, and the failure is due to a failure to receive a message in response to the attempt, the controller 320 updates the prior reference value. For example, the controller 320 may update the prior reference value based on a signal quality value of a channel through which the attempt to access the network has failed.

Further, when no channel have a signal quality satisfying the current reference value, the controller 320 attempts to access the network through a channel which does not satisfy the reference value and thus has not been used for the attempt to access the network, among the channels DCDs of which have been acquired. For example, the controller 320 may arrange the channels that have not been used for the network access attempts, among the channels DCDs of which have been acquired, according to the priorities of the NAP IDs, and then attempt to access the network through a target channel selected according to the arranged order.

Further, in order to prevent the reference value from being excessively raised, the controller 320 may periodically or aperiodically initialize the current reference value.

For example, when a predetermined time passes after the reference value has been initialized or updated or when the terminal has moved more than a predetermined distance from the position at which the reference value is initialized or updated, the current reference value may be initialized. Further, when the signal quality value of a channel through which the network access attempt has succeeded is less than an original reference value, the original reference value may be updated or initialized based on the signal quality value.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for attempting to access a network from among a plurality of networks by a mobile terminal, the method comprising:
   attempting to access the network through at least one target channel determined by the mobile terminal, such that the at least one target channel has a measured signal quality value at least equal to a predetermined reference value among signal quality values measured for channels corresponding to network access provider identification information indicating the network having a highest priority among the plurality of networks, wherein attempting to access the network comprises:
   sequentially selecting the signal quality values measured for the channels corresponding to the network access provider identification information indicating the network having the a highest priority among the plurality of networks, one-by-one, according to a descending order from a highest signal quality value; and
   attempting, when a selected signal quality value is at least equal to the a predetermined reference value, to access the network through a target channel having the selected signal quality value;
   updating a prior reference value based on a signal quality of the target channel having the selected signal quality value when the mobile terminal does not receive a response to an attempt to access the network through the target channel; and
   initializing, when the mobile terminal has moved a predetermined distance after the prior reference value is updated, the updated reference value.

2. The method of claim 1, further comprising: initializing, when a predetermined time passes after the prior reference value is updated, the updated reference value.

3. The method of claim 1, further comprising: attempting, when an attempt to access the network through the at least one target channel fails, to access the network through at least one target channel having a measured signal quality value at least equal to a predetermined reference value among signal quality values measured for channels corresponding to network access provider identification information indicating the network having a next highest priority.

4. The method of claim 1, further comprising:
   sequentially selecting channels having measured signal quality values less than the predetermined reference value; and
   sequentially attempting to access the network through the selected channels.

5. An apparatus for attempting to access a network from among a plurality of networks by a mobile terminal, the apparatus comprising:
   a transceiver for transmitting or receiving a signal; and
   a controller for controlling the transceiver to attempt to access the network through at least one target channel determined by the mobile terminal, such that the at least one target channel has a measured signal quality value at least equal to a predetermined reference value among signal quality values measured for channels corresponding to network access provider identification information indicating the network having a highest priority among the plurality of networks, wherein the controller updates a prior reference value based on a signal quality of the target channel having the selected signal quality value when the mobile terminal does not receive a response to an attempt to access the network through the target channel, wherein the controller sequentially selects the signal quality values measured for the channels corresponding to the network access provider identification information indicating the network having a highest priority among the plurality of networks, one-by-one, according to a descending order from a highest signal quality value, and when a the selected signal quality value is at least equal to a predetermined reference value, attempt to access the network through a target channel having the selected signal quality value, and wherein when the mobile terminal has moved a predetermined distance after the prior reference value is updated, the controller initializes the updated reference value.

6. The apparatus of claim 5, wherein when a predetermined time passes after the prior reference value is updated, the controller initializes the updated reference value.

7. The apparatus of claim 5, wherein when an attempt to access the network through the at least one target channel fails, the controller controls the transceiver so as to attempt to access the network through at least one target channel having a measured signal quality value at least equal to a predetermined reference value among signal quality values measured for channels corresponding to network access provider identification information indicating the network having a next highest priority.

8. The apparatus of claim 5, wherein the controller sequentially selects channels having measured signal quality values that are less than the predetermined reference value, and sequentially attempts to access the network through the selected channels.

* * * * *